United States Patent [19]

Wong et al.

[11] Patent Number: 4,760,475
[45] Date of Patent: Jul. 26, 1988

[54] HOME TRACK POSITION ACQUISITION SYSTEM AND METHOD

[75] Inventors: Jimmy S. Wong, San Jose; Jerry E. Holter, Berkeley, both of Calif.

[73] Assignee: Ampex Corporation, Redwood City, Calif.

[21] Appl. No.: 930,598

[22] Filed: Nov. 13, 1986

[51] Int. Cl.⁴ .................. G11B 5/588; G11B 21/10
[52] U.S. Cl. .......................... 360/77; 360/70; 360/73
[58] Field of Search ............... 360/77, 70, 73, 19.1, 360/18

[56] References Cited

U.S. PATENT DOCUMENTS

| | | | |
|---|---|---|---|
| 3,925,816 | 12/1975 | Kihara | 360/19.1 |
| 4,127,881 | 11/1978 | Wakami et al. | 360/77 |
| 4,484,236 | 11/1984 | Wilkinson | 360/19.1 |
| 4,525,750 | 6/1985 | Hamalainen | 360/77 |
| 4,563,710 | 1/1986 | Baldwin | 360/19.1 |
| 4,597,023 | 6/1986 | Rijckaert | 360/77 |
| 4,638,379 | 1/1987 | Teshima | 360/77 |
| 4,672,470 | 6/1987 | Morimoto et al. | 360/19.1 |

Primary Examiner—Raymond F. Cardillo
Assistant Examiner—David L. Robertson
Attorney, Agent, or Firm—Elizabeth E. Strnad; Richard P. Lange

[57] ABSTRACT

A system and method are described for aligning a set of tracks which have been recorded simultaneously on a magnetic medium by a multichannel transducer mounted in a rotating scanner, with transducing channels of a corresponding multichannel transducer for reproduction. A scan identifier signal is recorded simultaneously by a rotating multichannel transducer at a predetermined location along each track. Means are provided for reproducing and summing simultaneously accessed scan identifier signals during consecutive scans of the multichannel transducer over the medium. The relative position of the recorded medium to the rotating multichannel transducer is changed in a direction across the length of the tracks. That relative position in which the largest amplitude of the summed scan identifier signals is obtained corresponds to the desired alignment with the set of tracks.

23 Claims, 11 Drawing Sheets

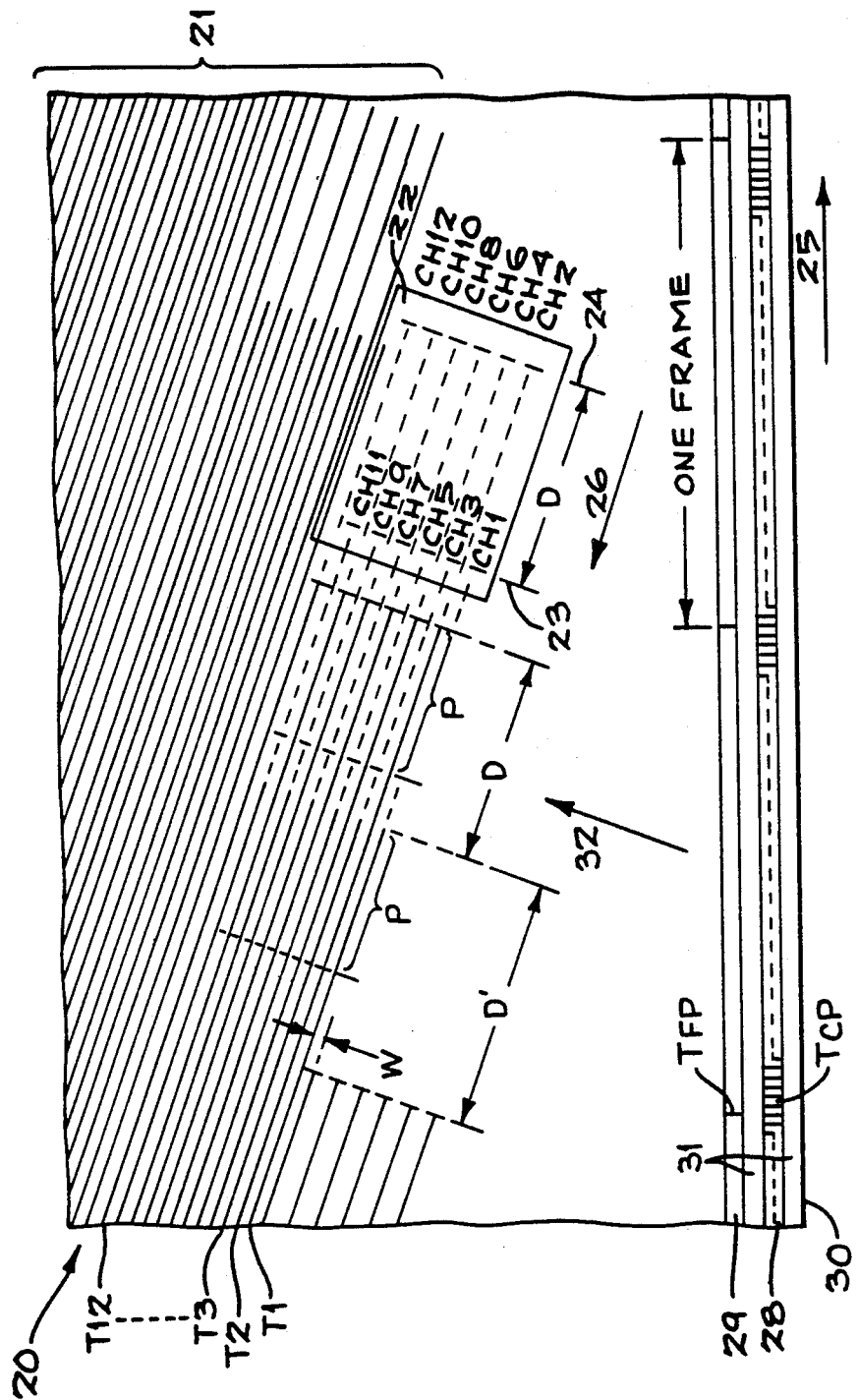
FIG_1

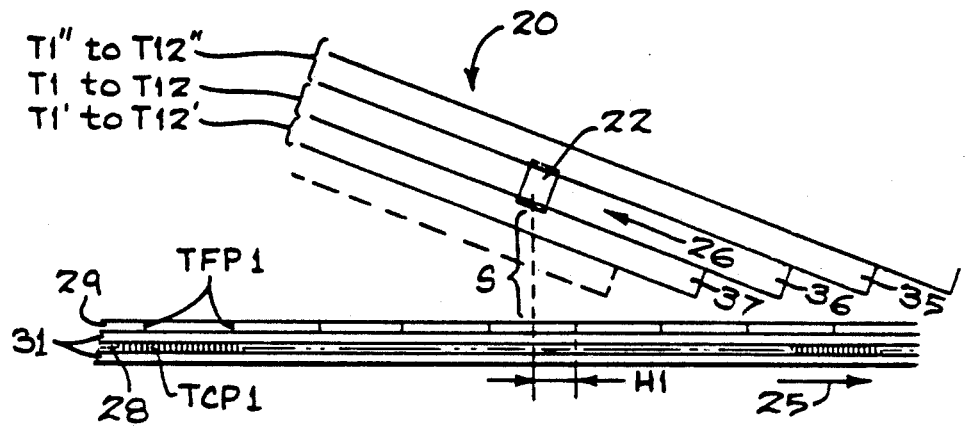
FIG_2A
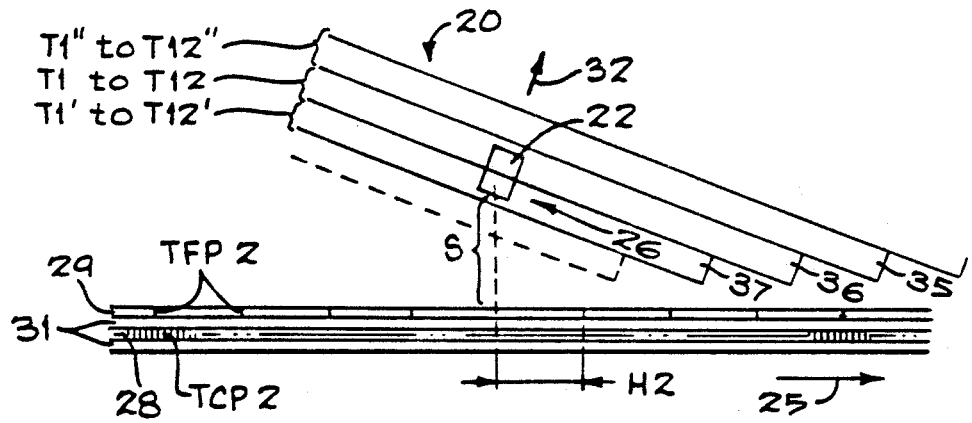
FIG_2B
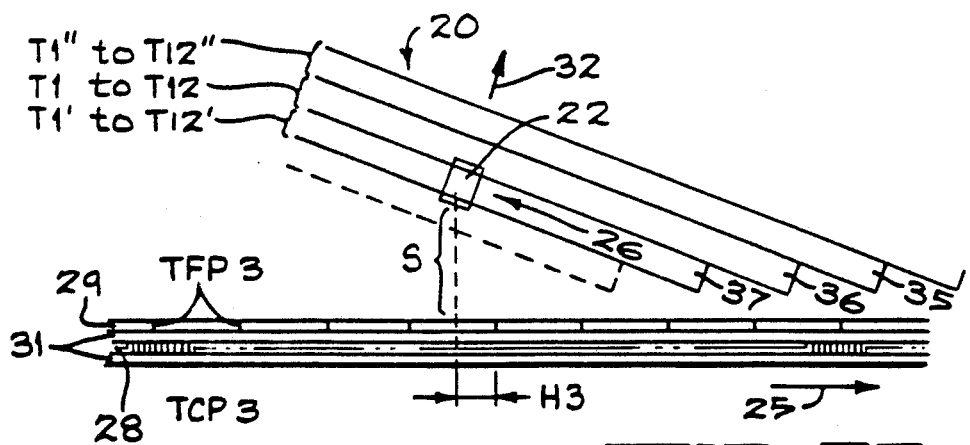
FIG_2C

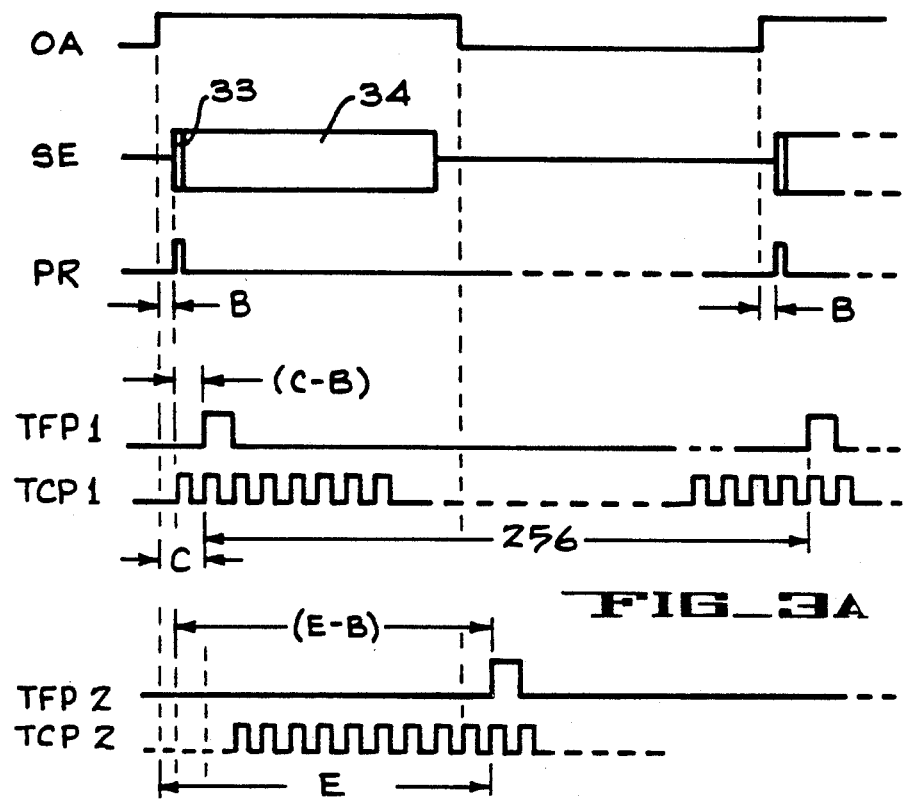
FIG_3A
FIG_3B
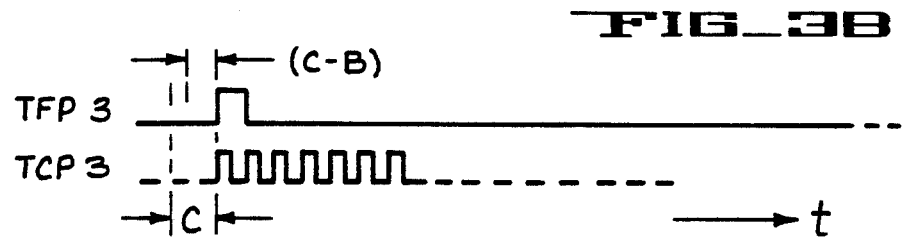
FIG_3C

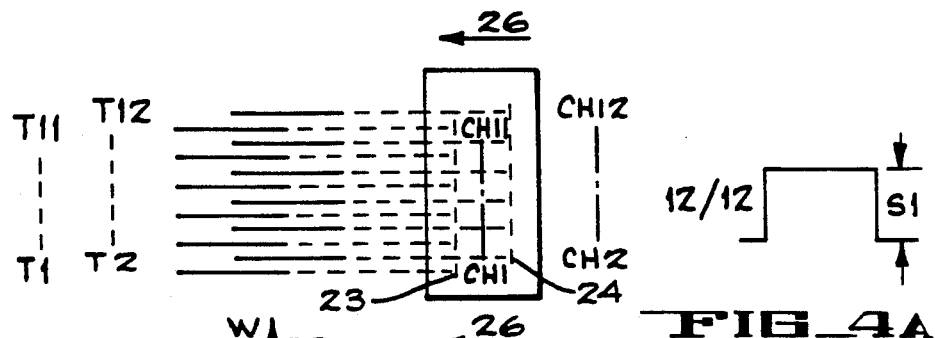
FIG_4A
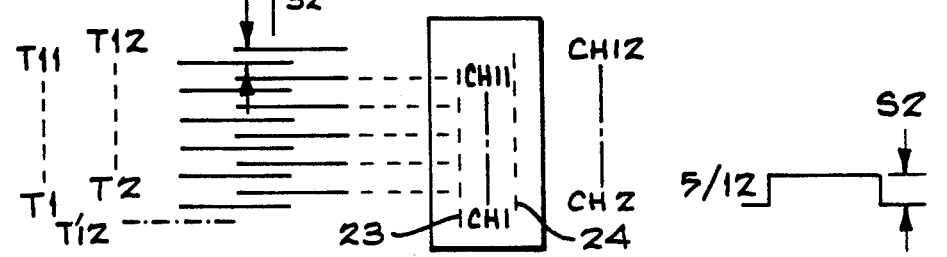
FIG_4B
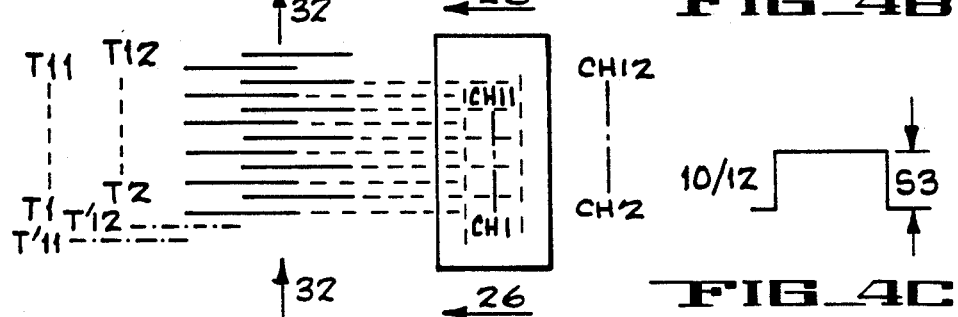
FIG_4C
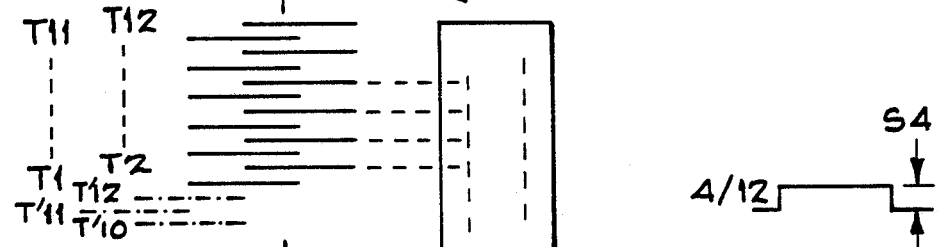
FIG_4D
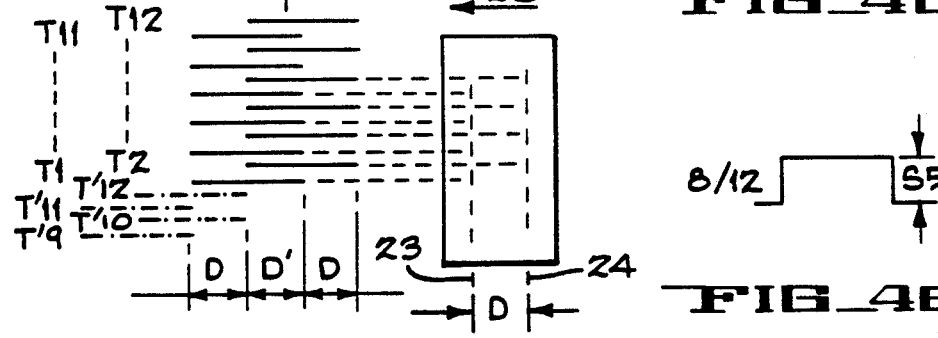
FIG_4E

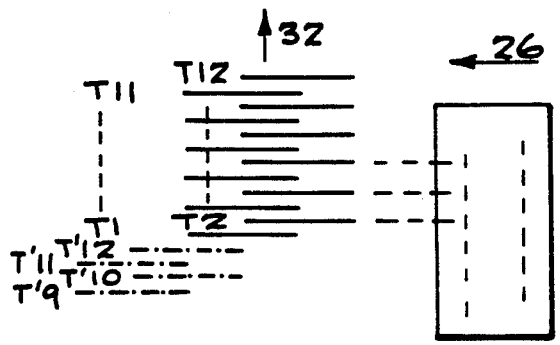
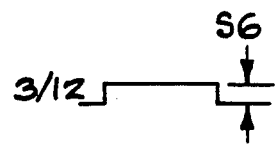
FIG_4F
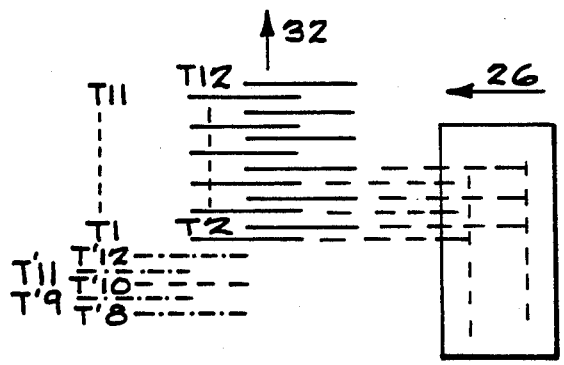
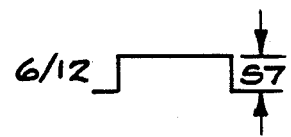
FIG_4G
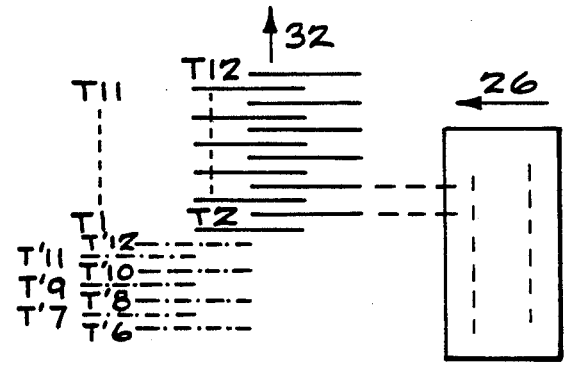
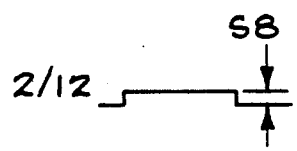
FIG_4H
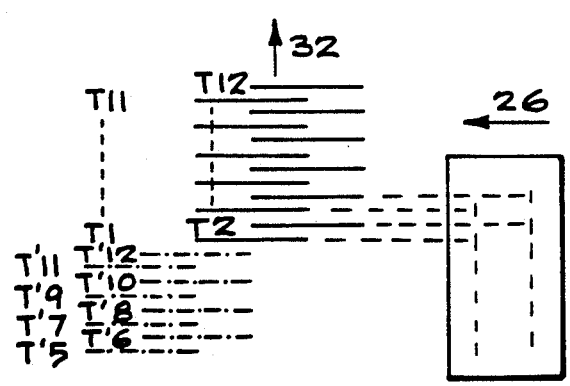
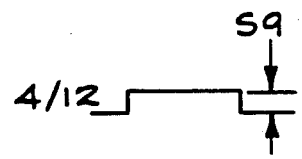
FIG_4I

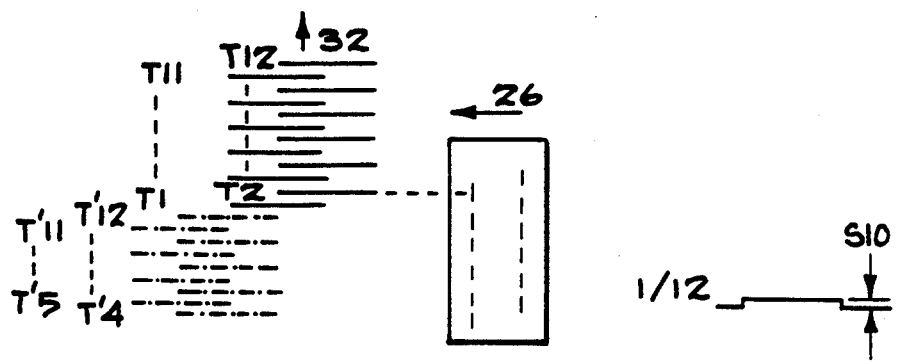
FIG_4J
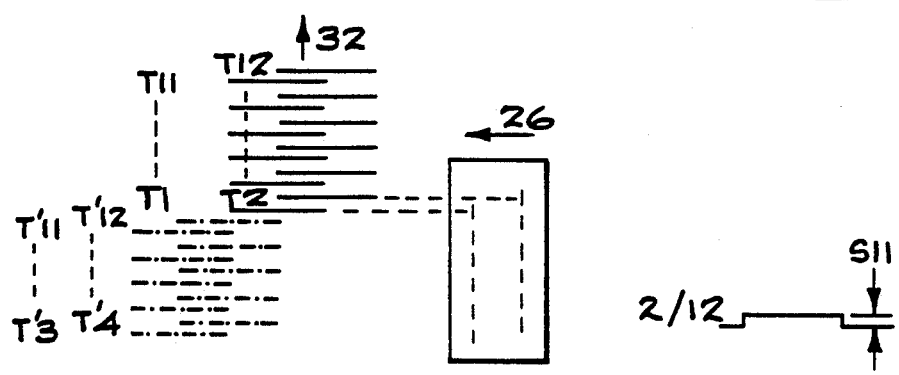
FIG_4K
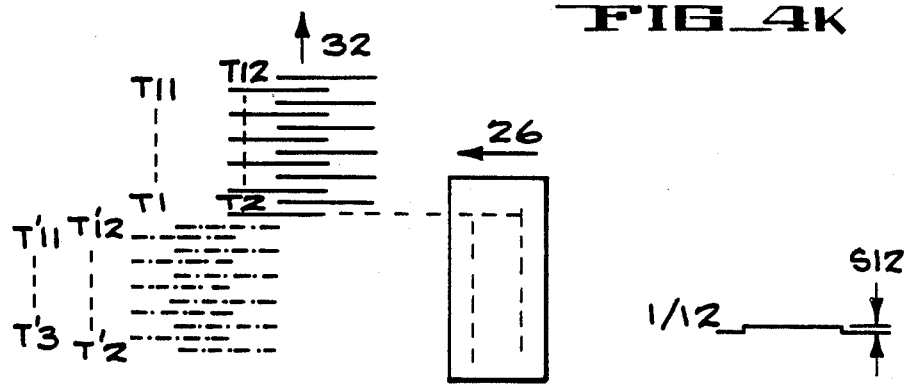
FIG_4L
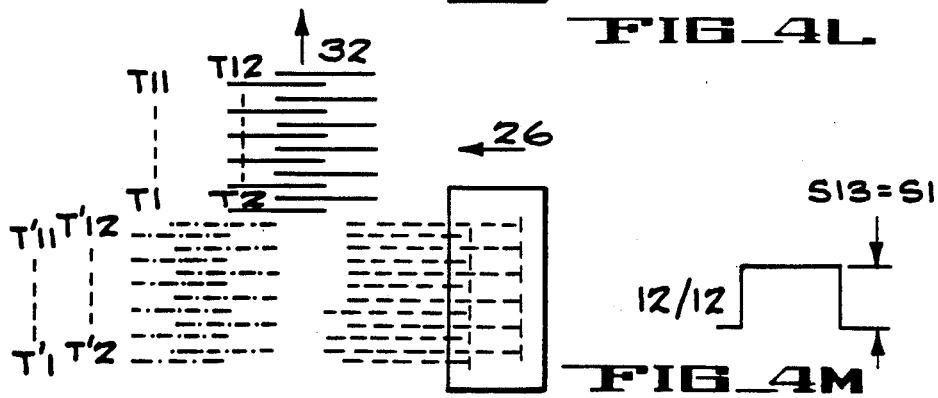
FIG_4M

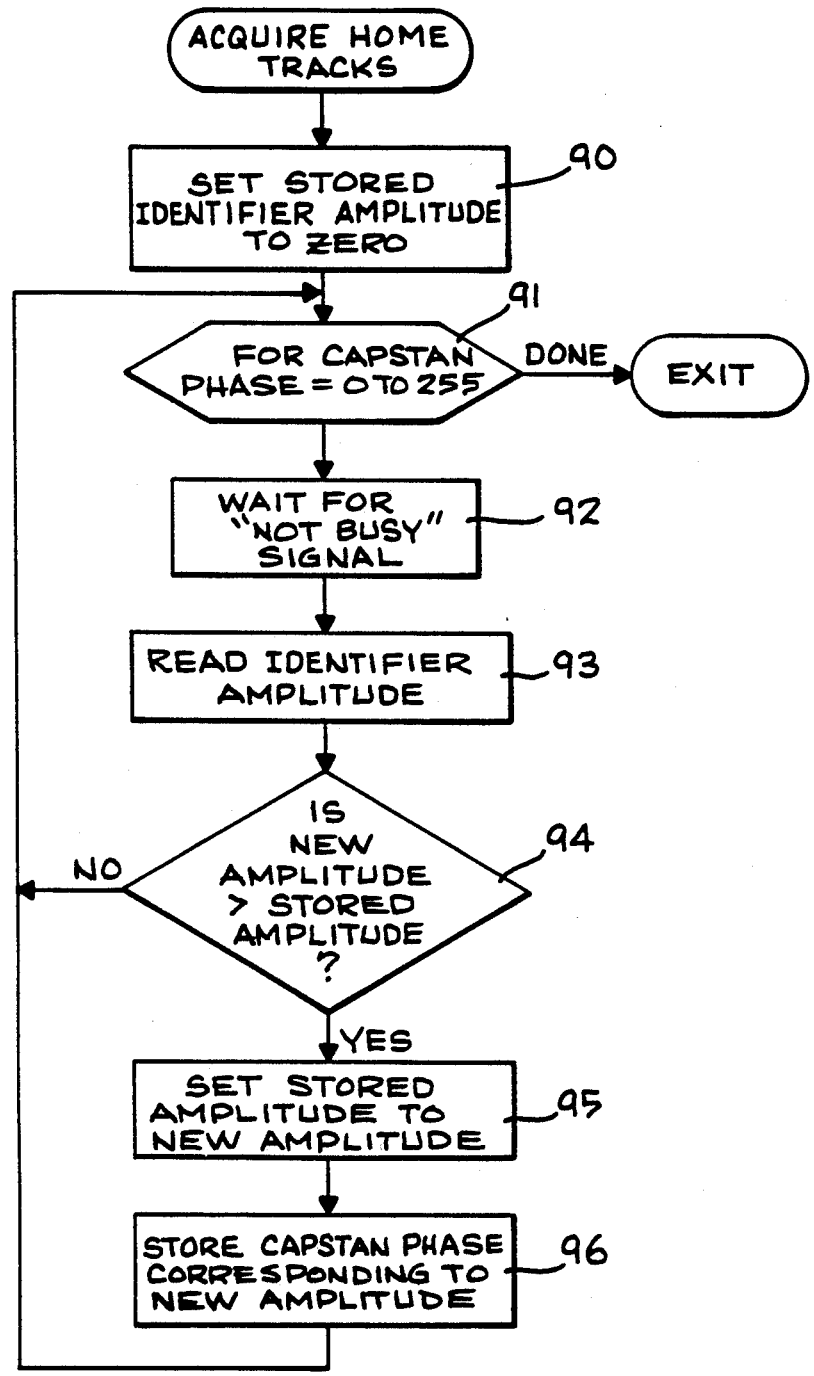
FIG_6

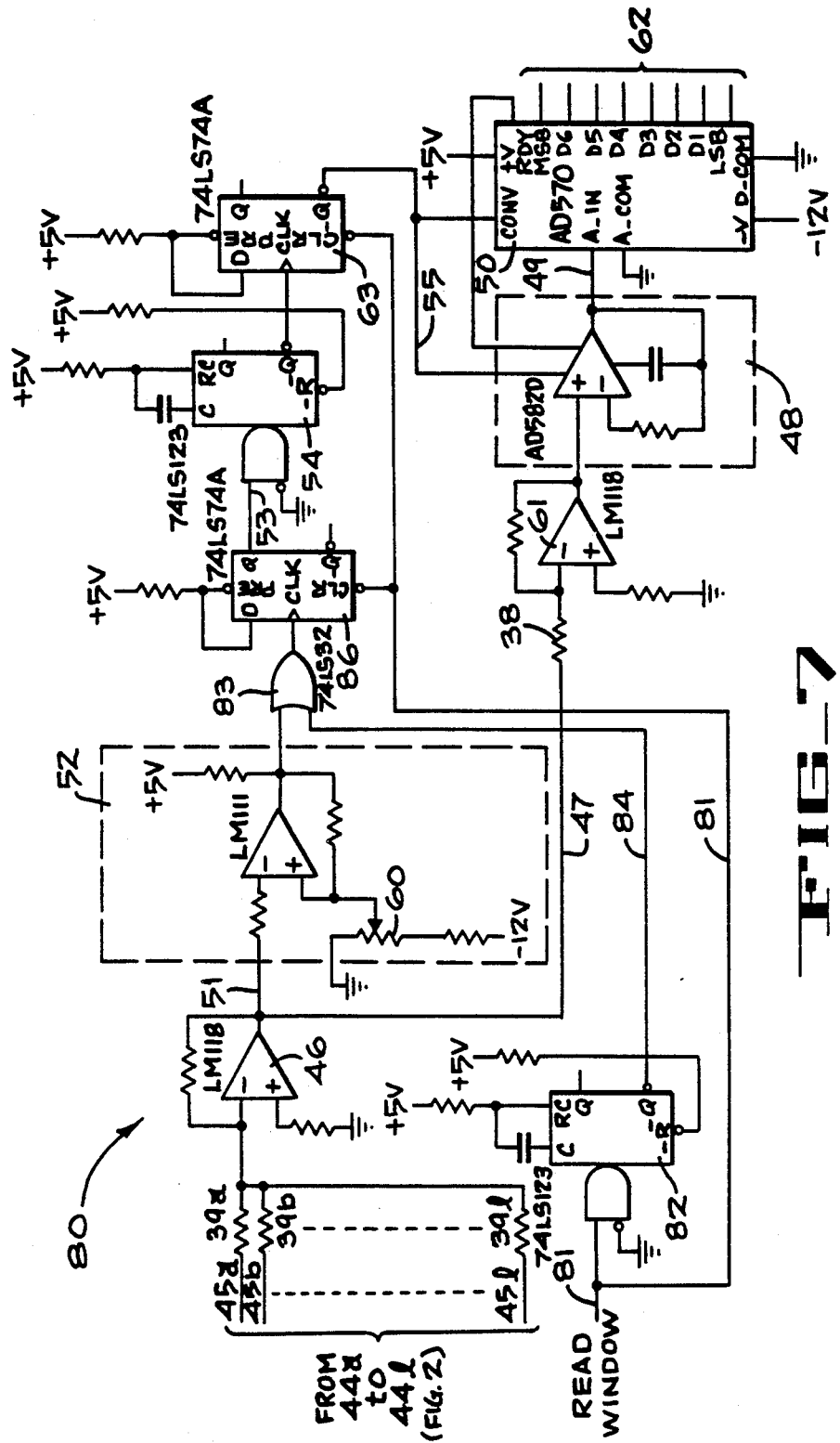
FIG_7

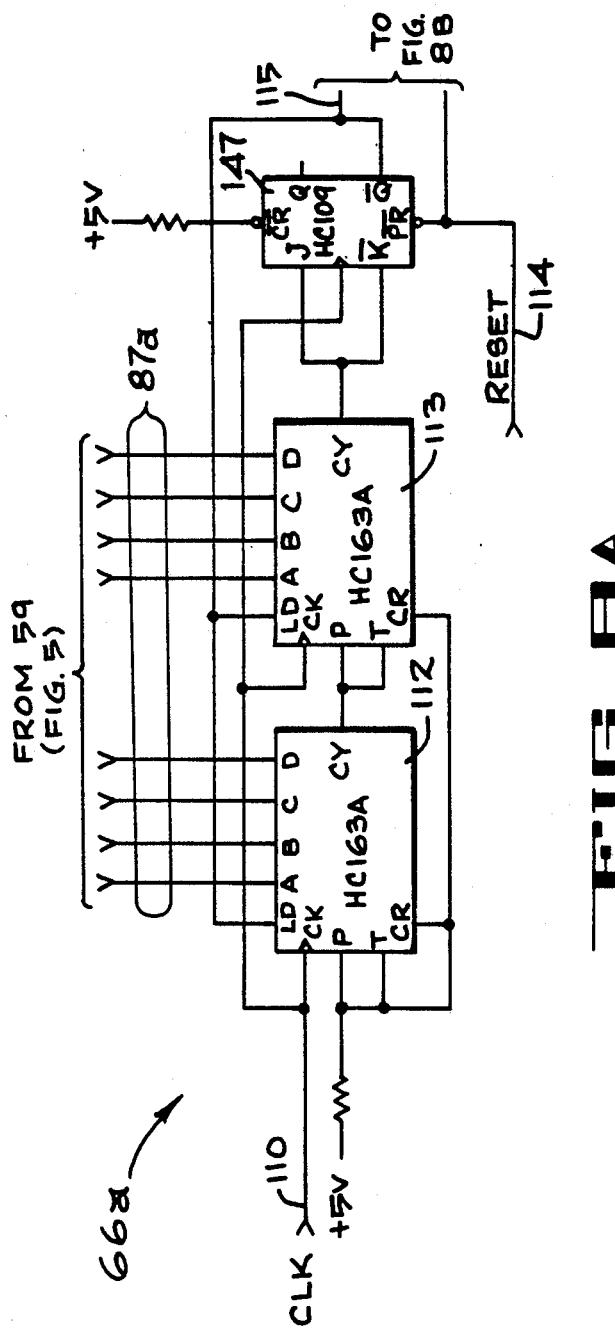

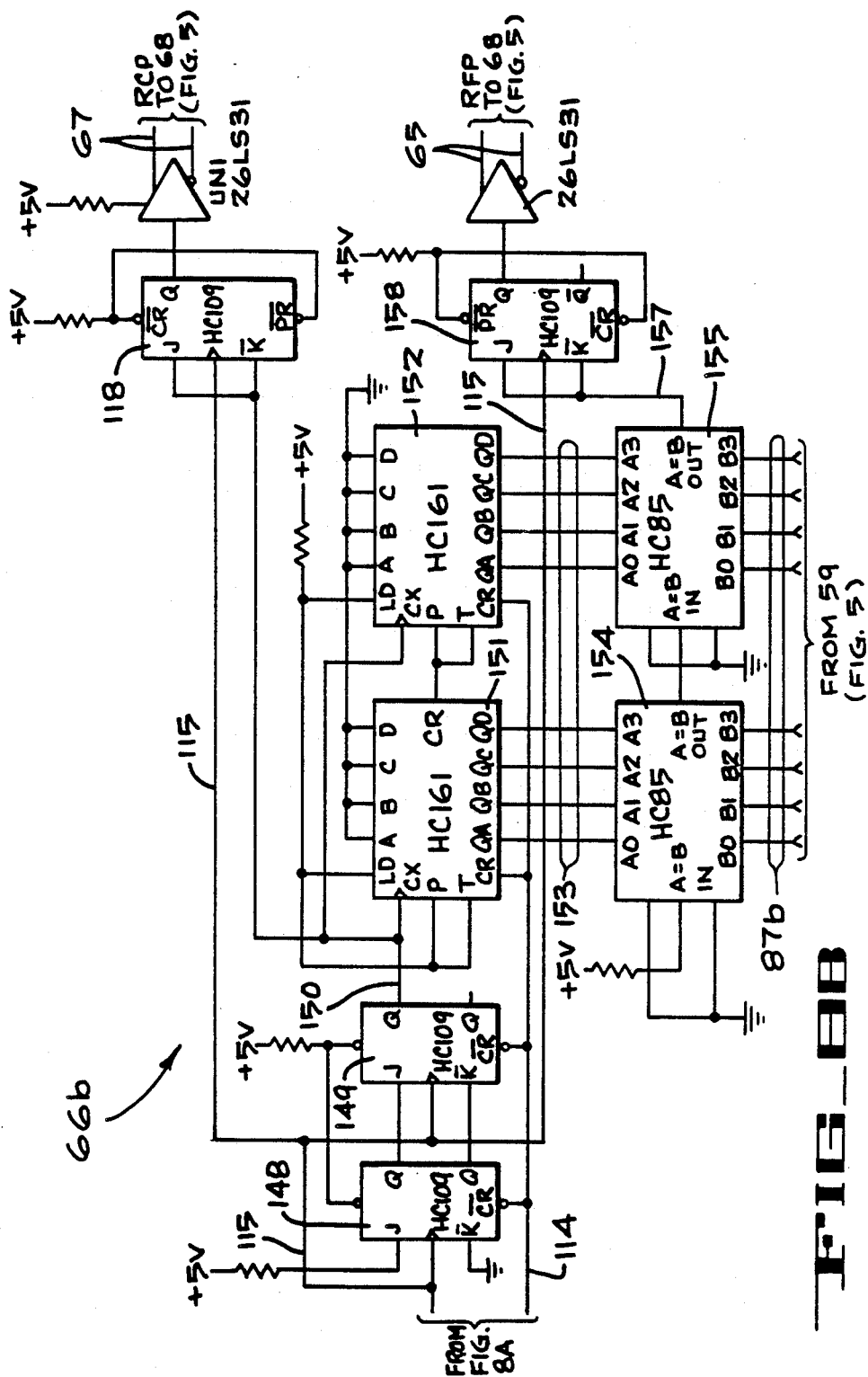

HOME TRACK POSITION ACQUISITION SYSTEM AND METHOD

The invention described herein was made in the course of contract No. 10446-78 awarded by the United States Government.

This invention relates to rotary scan magnetic recording/reproducing devices utilizing multichannel magnetic transducers, and more particularly it relates to a circuit for aligning a set of tracks which have been recorded on a magnetic medium simultaneously by a multichannel transducer with corresponding channels of a playback transducer.

BACKGROUND OF THE INVENTION

Multichannel magnetic transducers are known to be utilized for recording simultaneously a number of parallel tracks on a magnetic medium, each channel recording one track. For example, a set of tracks consisting of a fixed number of n parallel tracks may be recorded on a magnetic medium simultaneously during a single scan of a rotating multichannel transducer. By "scan" there is understood a passage or swipe of a rotating multichannel transducer over a magnetic medium for simultaneously recording or reproducing signals with respect to parallel tracks on the medium. For proper reproduction of the information content recorded, each such set of tracks must be accessed simultaneously by a corresponding multichannel transducer for playback. For the purpose of this description it will be further referred to a position of a playback multichannel transducer over a set of simultaneously recorded tracks as "home track position."

Known tracking systems in helical scan tape recording/playback devices utilize a pilot tone which is added to the information signal and recorded. The pilot tone is phase shifted on successive tracks by a known phase angle, for example by 90 degrees. During playback the pilot tone is separated from the information signal and applied as tracking information to a tracking servo. A phase comparator compares the reproduced pilot tone with a reference signal and the resulting phase error signal is applied to the tracking servo to correct for mistracking. While this circuit provides adequate tracking information when the multichannel head is within the home track position with an offset not exceeding one-half of a track width in either direction, reliable tracking information is not obtained outside that range. Because of the low signal-to-noise ratio obtained outside that range, the beginning of the reproduced data from each track cannot be reliably detected. Therefore, a pilot tone reference signal cannot be reliably initialized as is necessary at the beginning of each scan. It is therefore desirable to obtain a proper reference for acquiring home track position without utilizing the pilot tone.

SUMMARY OF THE INVENTION

The present invention uses a scan identifier signal which is recorded simultaneously by a rotating multichannel transducer at a predetermined location along each track. The scan identifier signal is a predetermined signal of a known amplitude and length. Preferably, it is a single frequency periodic signal, such as a sine wave or a square wave, that can be relatively easily separated from the reproduced information signal.

In accordance with the present invention the the scan identifier signals on adjacent sets of simultaneously recorded tracks are offset in the direction of transducer rotation to assure that these signals do not overlap. As it will follow from the detailed description, the length of offset is a function of scanner rotation speed and recording medium speed. During the process of acquiring home track position by a multichannel playback transducer for information signal reproduction, the scanner carrying the multichannel transducer is rotating at a relatively high speed and the medium is moving at a relatively low speed, as it is well known for example from rotary head tape recording/reproduction. The respective amplitudes of the reproduced scan identifier signals which are accessed simultaneously by the multichannel playback transducer during respective scans over the medium are summed. The relative position of the recorded parallel tracks with respect to the rotating multichannel transducer is changed in a direction substantially normal to a length of parallel tracks, to obtain relative movement of the transducer across the parallel tracks. A relative track-to-transducer position in which the largest sum of the scan identifier signal amplitudes is obtained is detected. That position corresponds to a home track position when the transducer is positioned over the predetermined location where scan identifier signals are recorded. The phase of a reference signal applied to the capstan servo utilized in the tape recording/reproducing device is adjusted accordingly to assume a corresponding tape position where the multichannel head is aligned with the set of home tracks to obtain proper reproduction of recorded information signals.

As the preferred embodiment, a home track position acquisition system is described utilizing a multichannel rotary helical recording/reproducing device. The scan identifier signal is recorded at the beginning of each track to eliminate noise which may be induced from an information signal recorded on the same track preceding the scan identifier.

In the preferred embodiment of the invention a microprocessor is utilized which adjusts stepwise the phase of a signal applied to a reference signal generator utilized in the capstan servo. The microprocessor receives and stores a summed amplitude of earliest accessed scan identifier signals obtained for each step. The microprocessor compares each two sums obtained for subsequent steps and stores the larger sum which is then compared with the next obtained sum. The process is repeated until the relative stepping of the multichannel head across a number of helical tracks corresponding to the number of channels in the multichannel head is finished. Thereafter the microprocessor adjusts the phase of the signal applied to the reference signal generator to correspond to that obtained for the largest summed amplitude. The capstan servo in turn adjusts the phase of a control signal applied to the capstan to adjust the longitudinal position of the tape with respect to the multichannel transducer to correspond to the home track position.

It is understood that while a preferred embodiment is described which is related to helical scan tape recording, the invention is not limited thereto. Alternatively, the home track position acquisition system and method of the present invention may be adapted to other types of rotary head recording/reproducing devices, for example rotary-longitudinal and transverse recorders.

While the preferred embodiment of the invention utilizes a multichannel transducer having interlaced transducing channels, it will be understood that the invention may be utilized with transducers having non-interlaced channels as well.

BRIEF DESCRIPTION OF THE DRAWINGS

FIG. 1 is a schematic fragmentary elevation view of a stretched out portion of magnetic tape illustrating a recording format and a multichannel head in home track position in accordance with the preferred embodiment of the invention.

FIGS. 2A to 2C show various relative head-to-track positions.

FIGS. 3A to 3C are timing diagrams corresponding to FIGS. 2A to 2C, showing various signals utilized in the preferred embodiment.

FIGS. 4A to 4M are consecutive diagrams showing various relative head-to-track positions and a sum of earliest played back scan identifier signal amplitudes corresponding to each position.

FIG. 6 is a flow chart depicting operation of the microprocessor of FIG. 5.

FIG. 7 is a detailed circuit diagram corresponding to a portion of FIG. 5.

FIGS. 8A and 8B are consecutive portions of a detailed circuit diagram showing a preferred embodiment of a reference signal generator of FIG. 5.

DETAILED DESCRIPTION

Figure 5:
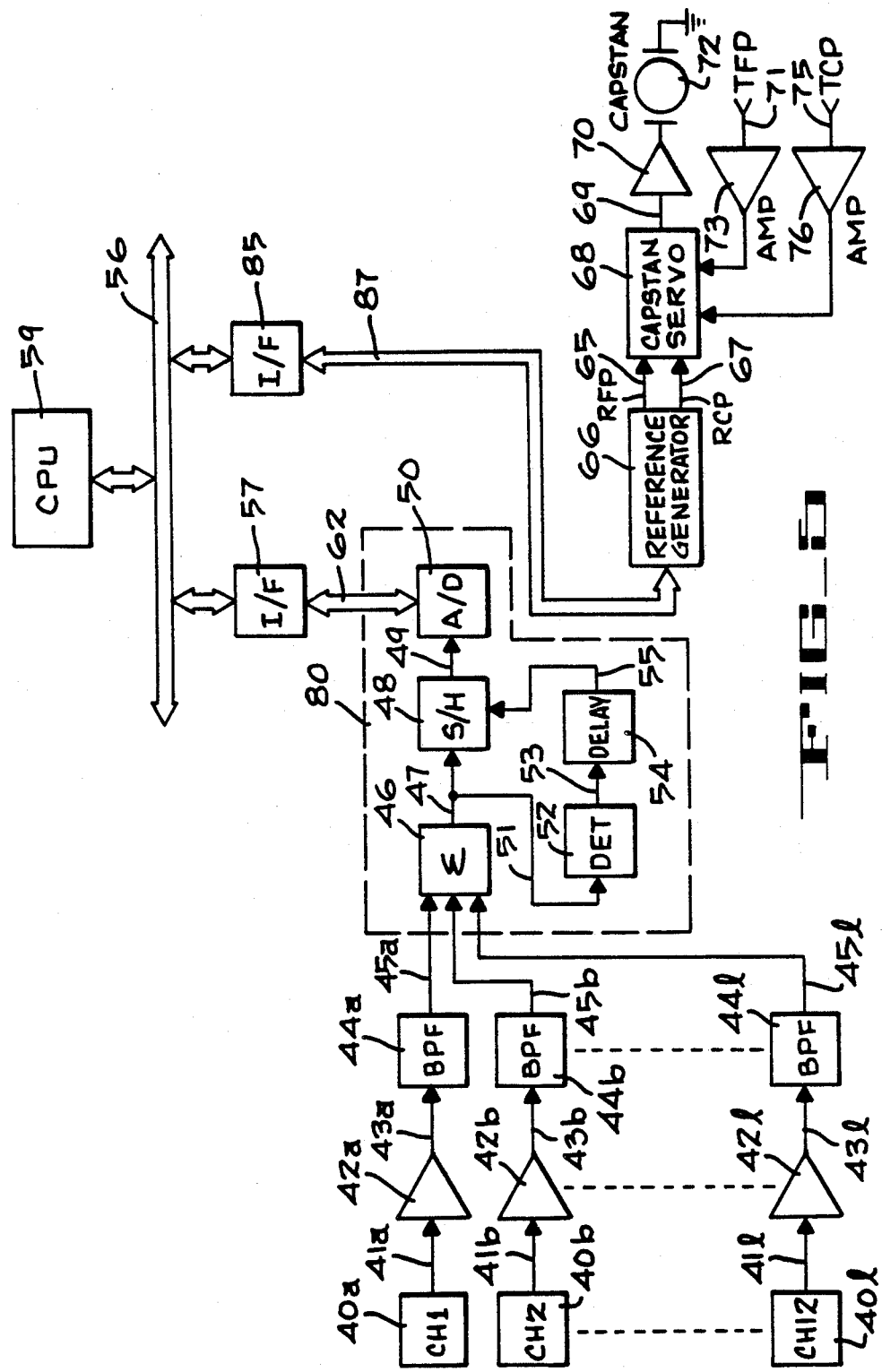
FIG. 5 is a block diagram of a preferred embodiment of the home track position acquisition system of the invention.

In the following description like reference numerals are utilized to designate like circuit elements in all the drawing figures to facilitate comparison.

Referring now to FIG. 1 of the attached drawings, there is shown schematically a portion of a magnetic tape 20 on which there is recorded a plurality of parallel helical tracks 21. For simplicity, each recorded helical track is represented by a single line T1 to Tn, corresponding to the middle of each track. In accordance with the preferred embodiment of the invention, a set of twelve adjacent tracks is recorded during each scan of a rotating multichannel transducer 22 over the magnetic tape. In the preferred embodiment one multichannel transducer is utilized, but generally two or more equidistantly spaced transducers mounted on the periphery of a rotating scanner drum may be used, as it is well known from helical tape recording/reproducing devices. The transducer 22 has a total of 12 interlaced transducing channels of which each set of 6 channels is arranged in two parallel head stacks as follows. The transducing gaps of the first stack, pertaining to the set of six odd numbered channels CH1 to CH11 are aligned along a first gap line 23. The transducing gaps of the six even numbered channels CH2 to CH12 pertaining to the second head stack are aligned along a second gap line 24. The odd and even numbered channels are interlaced such a way that each set of corresponding tracks recorded on tape is displaced with respect to the other set, in a direction 32 corresponding to the helical track width, so that the odd tracks T1 to T11 on tape are separated by even tracks T2 to T12, as it is seen from FIG. 1. The gap lines 23, 24 are parallel and are spaced from each other by a distance D in the direction of the helical track length, which is perpendicular to the track width. In the embodiment of FIG. 1 the tape is moving longitudinally in the direction of arrow 25 and the scanning transducer 22 rotates in the direction 26. The transducing gaps of both the odd and even channels enter the scan simultaneously along the respective helical tracks. Thus the above-indicated distance D between the odd and even channels of the transducer corresponds to the distance on tape between the beginning of odd and even numbered sets of tracks pertaining to the same scan.

In accordance with the preferred embodiment of the invention a single frequency periodic signal, for example a sine wave or a square wave, is recorded at the beginning of each helical track, in an area P preceding the recorded information signal, as it is shown in FIG. 1. That periodic signal will be further referred to as scan identifier, or shortly, identifier. The respective identifiers of all twelve tracks T1 to T12 are recorded simultaneously by a rotating multichannel head. In the preferred embodiment the frequency of the scan identifier signal is 8.25 MHz and the recorded information signal is a Miller square encoded data having a frequency range from 5.5 to 16.5 MHz.

The timing diagram of FIG. 3A shows an example of a signal envelope SE recorded on a helical track. That signal envelope comprises a scan identifier portion 33 recorded at the beginning of each track, followed by an information signal portion 34. During playback the scan identifier signal is separated from the information signal. The thusly obtained separated identifier signal envelope is shown at PR in FIG. 3A. The beginning of the identifier on each helical track is phase locked to a once around signal OA derived from the rotation of the scanner in a well known manner. In the example of FIG. 3A there is a known constant phase offset B between the signals OA and PR.

With further reference to FIGS. 1 and 3A, a tape control pulse (TCP) servo track 28 and a tape frame pulse (TFP) servo track 29 are recorded longitudinally along the tape edge 30, utilizing longitudinal heads (not shown) and longitudinal recording techniques well known in the art. Guard bands 31 separate these longitudinal tracks from each other and from the tape edge 30, respectively. As it is well known in the art of helical scan tape recording and playback, the control pulses TCP and frame pulses TFP are recorded during the information signal recording process and are phase locked to the once around scanner rotation signal OA. There is a known constant phase offset C between the OA and TFP 1 signals of FIG. 3A.

During playback the capstan servo utilizes the thusly phase locked control pulses TCP to maintain a desired constant tape speed. This is obtained by phase locking the off tape control pulses to a capstan servo reference signal RCP (not shown in FIGS. 3A to 3C). In the preferred embodiment where one multichannel head is utilized, one frame pulse TFP is recorded per rotation of the head drum, that is during one cycle of the once around signal OA as it is shown in FIG. 3A. As it is well known in the art, during playback the capstan servo utilizes the off tape frame pulses to phase lock the beginning of each scan of the multichannel playback head to the beginning of recorded helical tracks by phase locking the TFP pulses to the adjustable reference frame pulses RFP. Because the multichannel head 22 is mounted on the rotating scanner drum in a known position with respect to the once around signal OA, that OA signal is also a reference signal for the head position and the reference frame pulses RFP.

It follows from the above description that when the multichannel playback head 22 is in home track position, as it is shown in FIG. 1, the respective scan identifier signals from all twelve tracks T1 to T12 are accessed simultaneously by the channels CH1 to CH12 of head 22. This situation is also shown schematically in FIG. 2A where three sets of tracks 35, 36 and 37 are shown as recorded during consecutive scans of a multichannel head over the tape 20. In FIG. 2A the playback head 22 is accurately aligned with the set 36 of tracks T1 to T12. A corresponding timing diagram in FIG. 3A shows the tape frame pulses TFP 1 played back from the servo track 29 as having a desired correct phase relationship (C-B) with the beginning of each scan identifier 33 on all twelve tracks T1 to T12 simultaneously accessed by the multichannel head 22. Consequently, the head 22 is in home track position.

FIG. 2B shows a different head-to-helical tracks position in which the multichannel head 22 is not in home track position. FIG. 3B shows a corresponding phase offset E between the tape frame pulses TFP 2 and the OA signal which is different from offset C of FIG. 3A. Offset E corresponds to a change in the relative head-to-track position in direction 32 across the helical tracks by a distance corresponding to center-to-center spacings between six adjacent tracks. This relative position corresponds to a changed phase offset (E-B) between the played back frame pulse TFP 2 and the beginning of scan identifier signal envelope 33, as it is shown in FIG. 3B.

A still different head-to-helical tracks position is shown in FIG. 2C. Here the tape is offset relative to the head in the previously described direction 32 by a still greater distance corresponding to an additional distance of six center-to center track spacings. Therefore the head 22 is now offset by twelve track spacings from the previous home track position shown in FIG. 2A, resulting in alignment of all the twelve channels of the head 22 with tracks T'1 to T'12 of the set 37 shown in FIG. 2C. The head 22 is thus in a new home track position. A timing diagram corresponding to this situation is shown in FIG. 3C where the off tape frame pulses TFP 3 are shown as having the same phase offset (C-B) with reference to the beginning of the identifier envelope 33 as in FIG. 3A. It is seen that while the relative head-to-helical track position in FIG. 2B is different from those in FIGS. 2A or 2C, the distance S between the head 22 and the servo track 29, remains constant in all three Figures. Note also that the offset H2 shown in FIG. 2B is different from H1 and H3 of FIGS. 2A and 2C, respectively. The foregoing results from moving the tape relative to the rotating head in the longitudinal direction 25, what in turn is obtained by changing the phase relationship between the TFP and OA signals, thereby obtaining a resulting change in the position of the helical tracks relative to the head in direction 32, as it will follow from further detailed description.

In the preferred embodiment there are 256 tape control pulses TCP recorded within one tape frame pulse TFP period. As it will follow from the operation of the preferred embodiment, the relative position of the TFP pulses recorded on tape is stepped in the longitudinal direction 25 with reference to the scanner rotation pulse OA by a distance corresponding to the length of one control pulse TCP at a time. Thus, the stepping resolution is equal to one cycle of the TCP signal. However, if desired, different step sizes may be utilized, for example by deriving clock pulses from both edges of the TCP signal. The smaller the step size, the better is the resolution of the home track acquisition process, as it will follow from further description. As a further alternative, continuous change in the relative position of the tape may be provided.

FIGS. 4A to 4M show consecutive diagrams of respective relative transducer-to-helical track positions obtained by changing the phase relationship of the TFP pulses to OA pulses, whereby the prerecorded tape is repositioned relative to the rotating multichannel transducer in the longitudinal direction 25 as above described. As a result, the helical tracks are effectively stepped relative to the head 22 in a direction across the tracks as indicated by arrow 32 in FIG. 1. While in the preferred embodiment the tape is stepped by 256 steps, each step corresponding to one cycle of the TCP signal, in FIGS. 4A to 4M only twelve steps are shown to facilitate representation, where each step is shown as corresponding to a distance W between adjacent helical track centers. The alignment of tracks and channels, for each represented step resulting in obtaining the earliest simultaneously accessed scan identifiers, is shown by interrupted lines.

In accordance with the preferred embodiment, after each step, that is in each of the above indicated situations of relative tape-to-head position as shown by FIGS. 4A to 4M, as well as after each intermediate step (not shown) taken between these shown positions, the amplitudes of the earliest simultaneously accessed scan identifier envelopes by the playback head 22 are summed. As it is seen from FIGS. 4A to 4M, in each situation where less than all the tracks of a set of tracks corresponding to home track position are acquired, the sum of thusly accessed envelopes is less then twelve. The respective summed amplitudes obtained in each of the FIGS. 4A to 4M are shown as follows.

With further reference to FIG. 4A it represents home track position, where all twelve tracks and channels are aligned. All the twelve identifier signal envelopes are accessed simultaneously and summed. The resulting earliest summed amplitude is designated s1, to which for the purpose of further description there is assigned a value $s1 = 12/12 = 1$.

In FIG. 4B the tape is repositioned in the longitudinal direction 25 shown in FIG. 1 by a number of control pulses TCP corresponding to moving the recorded helical tracks with respect to the rotating transducer 22 in the direction of arrow 32 by the above-described distance W. It is seen that in this situation the earliest accessed identifier signals are obtained simultaneously by channels CH3, 5, 7, 9 and 11 on tracks T2 to T10, which after summing the signal amplitudes will amount to $s2 = 5/12$. In this case while the even numbered channels CH 2, 4, 6, 8, 10 and 12 are aligned with the odd numbered tracks T1 to T11, the identifier signals thereon are accessed after accessing the identifier signals on tracks T2 to T10 as described above. Similarly, even though track T'12 which pertains to an adjacent set of twelve simultaneously recorded tracks is aligned with channel CH1, the identifier signal recorded thereon is accessed after accessing the identifier signals on tracks T2 to T10. As it has been described before, only the amplitudes of the earliest accessed identifier signals are summed by the circuit of the invention.

FIG. 4C shows a situation where the tracks have been further stepped in the upward direction 32 by the distance W. Here the earliest simultaneously accessed identifiers are on tracks T1 to T10 by channels CH3 to CH 12. The resulting summed amplitude is $S3=10/12$. As the tracks are further stepped sequentially by the distance W at a time in the direction of arrow 32, the respective situations obtained are shown in the following FIGS. 4D to 4M, where the following respective summed amplitude values are obtained in sequence: $s4=4/12$; $s5=8-/12$; $s632\ 3/12$; $s7=6-/12$-; $s8=2/-12$; $s9=4/-12$; $s10=1/12$; $s11=2/12$; $s12=1/12$; and $s13=s1=12/12$. In the situation depicted in FIG. 4M none of the channels is aligned with the above described set of tracks T1 to T12, while all the channels CH1 to CH12 are aligned with the set of tracks T'1 to T'12 adjacent to tracks T1 to TR12. Thus in this situation the obtained summed amplitude s3 corresponds to s1 and the transducer 22 is also in a home track position.

It has been noted previously that the distance D between the respective beginnings of the odd and even tracks on tape corresponds to the distance between the gap lines 23, 24. In FIG. 1, the distance D' between the beginnings of two adjacent sets of tracks is shown as being greater than D but preferrably these distances are selected equal. It will be understood by those skilled in the art that the length of the scanner identifier offset is a function of the speed of scanner rotation and longitudinal tape speed. However, the length of the scan identifier signal P shown in FIG. 1 is shorter than either offset D or D'. Consequently, a scan identifier pertaining to a later recorded set of tracks is offset from an earlier recorded one in the direction 26 of scanner rotation to assure that it will always be accessed after accessing an identifier of an earlier recorded set. Thus identifiers from two different sets of tracks do not overlap and therefore will not be summed together.

It follows from the foregoing description that the largest amplitude of the summed identifier signal is obtained when the multichannel transducer is in home track position. After the home track position has been acquired by the system of the present invention, the desired head-to-track alignment may be maintained during playback utilizing any of the well known automatic track following circuits.

With further reference to FIG. 5 there is shown a block diagram of a preferred embodiment of the home track position acquisition system of the invention which is described below. The respective playback channels CH1 to CH12 of the multichannel transducer of FIG. 1 are designated in FIG. 5 as channels 40-a to 40-l. The played back scan identifier and following data from each channel are applied via separate lines 41-a to 41-l, preamplifiers 42-a to 42-l, and lines 43-a to 43-l to respective band pass filters 44-a to 44-l. The band pass filters separate each scan identifier from the following data and the resulting filtered scan identifier is in the form of a signal envelope as it is shown at 33 in FIG. 3A. The output signal from the band pass filters is applied via lines 45-a to 45-l to a summing circuit 46. The summed signal envelopes are in the form of a pulse, also referred to as the summed identifier pulse. The amplitude of that pulse corresponds to the sum of all the played back signal envelopes which have been simultaneously accessed by the multichannel playback head. That summed pulse is applied via line 47 to a sample and hold circuit 48 which takes a sample from the middle of the earliest received summed pulse.

To obtain the sample, the output signal from the summing circuit 46 is applied via line 51 to a threshold detector 52 which determines whether the amplitude of the resulting summed pulse is at least equal to a predetermined minimum value, to eliminate from consideration spurious pulses such as noise. If the summed amplitude is greater than the threshold, the detector 52 applies a pulse via line 53 to a delay 54. The delay is selected such that a delayed output pulse on line 55 therefrom coincides with the middle of the summed pulse in the sample and hold circuit 48. That delayed pulse on line 55 is utilized to sample the summed pulse received by the sample and hold circuit 48 via line 47. The thusly obtained analog sample is applied via line 49 to an analog-to-digital converter, shortly A/D 50. The A/D 50 converts the analog signal on line 49 to a digital signal and applies that digital signal to a microprocessor, shortly CPU 59 via line 62 and interface circuit 57.

In the block diagram of FIG. 5 there is further shown a capstan 72 controlled by a capstan servo 68 as it is well known in the art of helical tape recording. The capstan servo 68 receives via line 71 and amplifier 73 the previously described tape frame pulses TFP which are played back from the the servo track 29 in a well known manner. The capstan servo 68 further receives the played back control pulses TCP from the servo track 28 via line 75 and amplifier 76. As it has been mentioned previously, in the preferred embodiment there are 256 control pulses recorded within the period of one frame pulse. As it is well known in the art, and is also shown in FIGS. 3A to 3C, the frame pulses TFP are recorded synchronously with the control pulses TCP and each frame pulse has a known phase relationship to the once around scanner pulse OA.

A capsten servo reference signal generator 66 is utilized to apply refernce frame pulses RFP and reference control pulses RCP via respective lines 65, 67 to the capstan servo 68. As it is well known from digital capstan servo circuits, the servo 68 compares the phase of the played back frame pulses TFP with the phase of the reference frame pulses RFP provided by the reference signal generator 66. The RFP pulses are synchronous with a system reference clock, which in turn is synchronous with the scanner once around rotation pulse OA. The position errors detected by the capstan servo 68 are applied via line 69 to a motor drive amplifier 70, coupled to the capstan motor. Depending on the sense and magnitude of the error, the motor drive amplifier increases or reduces the voltage applied to the capstan motor, to compensate for the error.

As it will be described in more detail with reference to the circuit diagram of FIGS. 8A and 8B, the phase of the output pulses RFP provided by the reference signal generator 66 is adjustable by the microprocessor CPU 59. Adjustment of the relative phase of tape frame pulses with reference to the once around pulse OA is thereby obtained, resulting in acquiring a relative head-to- tape position corresponding to a desired alignment with the home tracks.

In operation, the CPU 59 applies via interface 85 a digital signal to the capstan servo reference signal generator 66, corresponding to a known phase adjustment of the reference signal RFP applied therefrom on line 65 with reference to a once around scanner rotation pulse OA. That known phase adjustment causes the relative helical tracks-to multichannel head position to "step" by one step at a time across the helical tracks as it has been described with reference to FIGS. 2A to 2C, 3A to 3C and 4A to 4M. It follows from the previous description that the phase adjustment corresponds to a change in the longitudinal position of the tape relative to the position of the multichannel transducer 22 mounted on the rotating scanner. In the preferred embodiment one such step in the longitudinal direction corresponds to the width of one reference control pulse RCP recorded on tape.

After each step the CPU 59 receives and stores a summed identifier pulse sample applied thereto by the A/D converter 50 via interface 57. The new sample is compared by the CPU with the previously stored sample and that sample whose amplitude is larger is stored by the CPU 59 for the next comparison. The foregoing process is repeated 256 times, that is after the tape has been stepped past the head across a number of adjacent helical tracks corresponding to the number of tracks in the set.

The foregoing operation is depicted in the flow chart of FIG. 6 whose description follows. As it is indicated by block 90 of FIG. 6, the CPU 59 first sets the stored summed identifier pulse value to zero. The following block 91 represents a "for" loop which adjusts the phase of the reference signal RFP by one count at a time, from 0 to 255 counts. After each adjustment the operation continues as it is shown by block 92, which waits for a "not busy" signal indicating presence of a read window for the summed pulse amplitude. Upon receiving the "not busy" signal the amplitude of the signal applied by the A/D 50 is read by the CPU 59, as it is indicated by block 93. Block 94 checks if the new amplitude is larger than the previously stored amplitude. If it is not larger, the presently stored amplitude remains in the memory and the above described process repeats from block 91. If the new amplitude is larger than the presently stored amplitude, that larger amplitude replaces the contents of the memory, as it is depicted by block 95. Simultaneously a capstan phase which corresponds to that newly stored amplitude is also stored in the CPU 59 memory, as it is shown by block 96. That capstan phase is the current number between 0 and 255 indicated by block 91. The foregoing process is repeated as shown by the block 91 for all the capstan phase values 0 to 255, that is until the amplitude corresponding to the last value or step 255 is obtained by the CPU 59.

It is understood from the foregoing description that the CPU 59 of FIG. 5 applies the resulting stored capstan phase value via bus 56, interface 85 and line 87 to the reference signal generator 66 which in turn adjusts the phase of the reference output signals RFP, RCP on lines 65, 67 to correspond to that value. As it is well known in the art of capstan servos, servo 68 applies a signal via line 69 and amplifier 70 to accelerate or decelerate the capstan 72 until the signals TFP and TCP on lines 71, 75 are in phase with the signals RFP and RCP on lines 65,67. Because in the preferred embodiment the resolution of the capstan phase adjustment is equal to one cycle of TCP signal, only the TFP signal phase will be adjusted.

Now a more detailed schematic circuit diagram shown in FIG. 7 will be described. The diagram of FIG. 7 corresponds to a portion of the block diagram of FIG. 5, encircled by interrupted line 80. As it has been noted above, corresponding circuit portions in all drawing figures are designated by the same reference numerals to facilitate comparison. With further reference to FIG. 7, there are shown input lines 45-*a* to 45-*l*, each carrying an output signal from one of the band pass filters 44-*a* to 44-*l* of FIG. 5, via series resistors 39-*a* to 39-*l* to the previously described summing circuit 46, implemented by a summing amplifier. The threshold detector 52 is implemented in FIG. 7 by a differential amplifier whose inverting input receives via line 51 an output signal from the summing amplifier 46. The non-inverting input of amplifier 52 is connected to a potentiometer 60 which sets a desired threshold level, for example equal to a minimum summed identifier pulse amplitude value such as shown in FIG. 4J.

The delay 54 is implemented by a one shot. The one shot 54 is set by the leading edge of an earliest summed pulse on line 53, obtained from detector 52 via an OR gate 83 and flip-flop 86. On line 81 a read window is received from a system reference clock generator (not shown), as it is well known in the art. The read window resets the flip-flop 86 before the occurrence of each tape frame pulse TFP to enable sampling of the earliest summed pulse obtained during each scan. The signal on line 81 is also applied via a one shot 82 and line 84 to a second input of the OR gate 83. When the detected threshold level is below the minimum value, there is no signal applied on line 53. In that case the one shot 54 is triggered via the flip-flop 86 by the window on line 84 to maintain proper timing operation with the CPU. The output from the one shot 54 via a flip-flop 63 and A/D 50 informs the CPU 59 that the time for detecting the scan identifier has expired. This occurs in situations when the multichannel transducer is completely off tracks. The flip-flop 63 is clocked by an output signal from the one shot 54 and is cleared by the undelayed window signal on line 81.

The summed amplitude from the summing amplifier 46 is applied via line 47, a series resistor 38 and inverter 61 to the sample and hold circuit 48. The circuit 48 receives the output signal from the summing amplifier 46 and holds that signal until a conversion from analog-to-digital signal by the following A/D converter 50 is finished. The output signal on line 55 from the flip-flop 63 has the sampling time delayed such that it samples the middle of the pulse held in the sample and hold circuit 48 while it also starts the conversion by the A/D converter 50. The A/D converter has an input coupled to receive the thusly obtained sample on line 49 from the sample and hold circuit 48. The output signal from the A/D converter 50 is applied via lines 62, conventional interface circuit 57 and data bus 56 to the CPU 59 as it has been previously described with reference to FIG. 5.

Generally it is not necessary to record the scan identifier signal at the beginning of each scan. In alternative embodiments it may be recorded at a different predetermined location along the parallel tracks. In that case it is necessary to assure that the summed scan identifier signal is obtained during a passage of the multichannel transducer over that predetermined location.

FIGS. 8A and 8B are consecutive portions of a detailed circuit diagram showing a preferred implementation of the capstan servo reference signal generator 66 of FIG. 5. The signal generator receives via line 110 a system reference clock signal CLK from the system reference clock generator (not shown), as it is well known in the art. The signal on line 110 is applied to a clock input of two series connected programmable dividers 112, 113 which receive via lines 87*a* an 8-bit signal from the CPU 59 of FIG. 5. That signal indicates the desired speed of rotation of the capstan 72 shown in FIG. 5 to obtain longitudinal tape motion at a desired speed. The dividers 112, 113 divide the input clock signal by a ratio determined by the signal on lines 87*a* and the output signal therefrom is reclocked by a flip-flop 147. The output signal on line 115 from flip-flop 147 is applied to two series connected flip-flops 148, 149, which further divide that signal by 4. The resulting signal on line 150 has a frequency equal to the previously described reference control pulses RCP and is reclocked by a flip-flop 118. The flip-flops 118 outputs on line 67 the previously described reference control pulses RCP, which are applied to the capstan servo as it is shown in FIG. 5.

The signal on line 150 is further applied to two series connected dividers 151, 152, which divide that signal by 256. The flip-flops 148, 149 and the dividers 151, 152 are reset periodically by a reset signal 114 that is synchronous with once around scanner rotation reference signal OA. The resulting divided signal has a frequency of the previously desribed reference frame pulses RFP. The output of the dividers 151, 152 is applied via lines 153 to one set of inputs of two series connected comparators 154, 155. The other set of inputs of these comparators receives via lines 87b a value indicating the capstan phase stored by the CPU 59, corresponding to the largest summed amplitude, as it has been previously described with reference to FIGS. 5 and 6. The comparator 154, 155 compares its two input signals and when they are equal it provides an output signal on line 157. That signal is applied to a flip-flop 158 which is reclocked by the previously described signal on line 115. The resulting output signal on line 65 from flip-flop 158 is the previously described reference frame pulse RFP applied by the capstan servo reference signal generator 66 to the servo 68, as it is shown in FIG. 5. It follows from the foregoing description that the thusly obtained RFP signal on line 65 is synchronous with the RCP signal on line 67. The timing, that is the phase of the signal RFP on line 65 is adjustable by adjusting the value of the signal on line 87b applied from the CPU 59.

Other portions of the block diagram of FIG. 5 which are not shown by detailed circuit diagrams may be implemented by circuits well known in the art.

What is claimed:

1. A system for acquiring a set of parallel tracks which have been recorded simultaneously on a magnetic recording medium by a rotating multichannel transducer, each track having recorded thereon a predetermined scan identifier signal of a known amplitude and length, said scan identifier signal being recorded simultaneously by said multichannel transducer in a predetermined location along said parallel tracks during a particular scan of the transducer over said medium, scan identifier signals recorded on adjacent sets of parallel tracks being offset in the direction of transducer rotation, said system comprising:
    means for reproducing said scan identifier signals and for summing amplitudes of scan identifier signals simultaneously accessed by a rotating multichannel transducer during respective scans thereof over the medium;
    means for changing a relative position of said recording medium with respect to the rotating multichannel transducer in a direction substantially normal to a length of said recorded parallel tracks; and
    means for detecting a relative medium-to-transducer position in which the largest sum of scan identifier signal amplitudes is obtained during a passage of said transducer over said predetermined location.

2. A system for acquiring a set of parallel helical tracks which have been recorded simultaneously on a magnetic tape by a rotating multichannel transducer, each track having recorded thereon a predetermined scan identifier signal of a known amplitude and length, said scan identifier signal being recorded simultaneously by said multichannel transducer in a predetermined location along said helical tracks, scan identifier signals recorded on adjacent sets of helical tracks being offset in the direction of transducer rotation, said system comprising:
    means for reproducing a signal recorded on said parallel tracks and for separating said scan identifier signal from an information signal reproduced from each track, said means having a rotating multichannel transducer;
    means for gradually changing a relative position of said magnetic tape with respect to the rotating multichannel transducer during constructive scans of said transducer over the tape to obtain a change in said relative position in a direction substantially normal to a length of said tracks;
    means for summing the amplitudes of simultaneously accessed scan identifier signals by said multichannel transducer obtained during a passage of said transducer over said predetermined location; and
    means for comparing the summed amplitudes and for storing an information related to a relative tape-to-transducer position in which the largest sum of said amplitudes is obtained.

3. The system of claim 2, further comprising:
    means for adjusting the relative tape-to-transducer position to correspond to a position in which the largest sum of said amplitudes is obtained.

4. The system of claim 2 wherein said scan identifier signals are recorded at a beginning of each helical track and wherein said means for summing are coupled to sum the amplitudes of earliest accessed scan identifier signals.

5. The system of claim 2 wherein said rotating multichannel transducer has interlaced parallel transducing channels.

6. The system of claim 2 wherein said tape has further a tape frame signal recorded thereon along a longitudinal track thereof, which signal is phase locked to the rotation of said multichannel transducer during recording, said system further having a capstan servo for maintaining a constant speed of said tape and a predetermined constant phase relationship between said tape frame signal and said scanner rotation during playback, further comprising;
    a reference signal generator for applying a reference tape frame signal to said capstan servo; wherein
    said means for gradually changing said relative position comprises means for adjusting stepwise the phase of said reference tape frame signal applied to said capstan servo, with respect to the phase of said scanner rotation; and wherein
    said means for comparing is coupled to store the phase of said reference tape frame signal corresponding to the largest summed amplitude.

7. The system of claim 6 wherein said means for adjusting is further coupled to adjust the phase of said reference tape frame signal to said stored phase which corresponds to the largest summed amplitude.

8. The system of claim 6 wherein said scan identifier signal is a single frequency periodic signal.

9. The system of claim 6 wherein said phase adjusting means and said means for comparing said amplitudes comprises a programmable control means coupled to adjust the phase of said reference tape frame signal stepwise by predetermined constant values.

10. The system of claim 9 wherein said programmable control means is coupled to compare each said summed scan identifier amplitude with a subsequently obtained summed amplitude and to store the larger one of the two amplitudes.

11. The system of claim 6 wherein said tape has further recorded thereon a control signal along a longitudinal track thereof, synchronously with said tape frame signal, said control signal has a frequency equal to an integer number multiple of the frequency of said tape frame signal and wherein said means for gradually changing said phase is coupled to adjust the phase of said reference tape frame signal with respect to said scanner rotation by a phase shift equal to an integer number of cycles of said control signal.

12. The system of claim 8 wherein said means for summing comprises:
- a summing circuit coupled to receive a plurality of separated scan identifier signals in the form of an envelope of said periodic signal, and to provide a sum of amplitudes of earliest simultaneously received envelopes;
- a sample and hold circuit coupled to receive and hold said summed amplitudes; and
- a threshold detector circuit coupled to receive said summed amplitudes, to provide a sampling signal when the amplitude of said received signal exceeds a predetermined threshold, and to apply said sampling signal to sample said summed amplitudes held in said sample and hold circuit.

13. A system for acquiring a set of parallel tracks recorded simultaneously by a rotary helical scan magnetic tape recording/reproducing device utilizing a multichannel transducer mounted on a rotating scanner, each said helical track having a predetermined scan identifier signal of a known amplitude and length recorded at the beginning thereof, said tape having tape frame pulses recorded along a longitudinal track thereof, said pulses being phase locked to the rotation of said scanner during recording, said device having a capstan servo for maintaining a constant speed of said tape and a predetermined constant phase relationship between said tape frame pulses and said scanner rotation during playback, comprising:
- means for separating said scan identifier signal from an information signal played back from each said track;
- means for providing a sum of amplitudes obtained from earliest simultaneously accessed separated scan identifier signals by a multichannel playback transducer;
- a reference signal generator for applying reference tape frame pulses to said capstan servo;
- a programmable control means coupled to adjust stepwise the phase of said reference tape frame pulses with respect to the phase of rotation of said scanner by predetermined constant values, thereby stepping a relative position of said tape with respect to said transducer across said helical tracks, to compare said sums of amplitudes obtained during respective steps and to store the phase of said reference tape frame pulses corresponding to the largest sum of amplitudes of said scan identifier signals.

14. A system for acquiring a set of parallel tracks recorded simultaneously by a rotary helical scan magnetic tape recording/reproducing device utilizing a multichannel transducer mounted on a rotating scanner, each said helical track having a single frequency periodic scan identifier signal recorded at the beginning thereof, said single frequency periodic signal having a known amplitude and a length smaller than an offset between adjacent sets of helical tracks recorded by said multichannel head, said tape having control pulses and tape frame pulses recorded synchronously along longitudinal tracks thereof, which pulses are phase locked to the rotation of said scanner during recording, said control pulses have a frequency equal to an integer number multiple of the frequency of the tape frame pulses, said device having a capstan servo for maintaining a constant speed of said tape and a predetermined constant phase relationship between said tape frame pulses and said scanner rotation during playback, comprising:
- means for separating a signal envelope of said scan identifier signal from an information signal played back from each said track;
- means for providing a sum of amplitudes of said separated signal envelopes obtained from earliest simultaneously accessed scan identifier signals by a multichannel playback transducer;
- a reference signal generator for applying reference tape frame pulses to said capstan servo;
- means for adjusting stepwise the phase of said reference tape frame pulses applied to said capstan servo, with respect to the phase of rotation of said scanner, each step corresponding to a phase shift equal to an integer number of cycles of said control pulses, thereby stepping said tape relative to said transducer across said helical tracks; and
- means for comparing the respective sums of amplitudes obtained during respective steps and for storing the phase of said reference tape frame pulses corresponding to the largest sum of amplitudes.

15. A system for acquiring a set of parallel tracks recorded simultaneoudly by a rotary helical scan magnetic tape recording/reproducing device utilizing a multichannel transducer mounted on a rotating scanner, each said helical track having a known single frequency periodic scan identifier signal recorded at the beginning thereof, said tape having tape frame pulses recorded along a longitudinal track thereof, which pulses are phase locked to the rotation of said scanner during recording, said device having a capstan servo for maintaining a constant speed of said tape and a predetermined constant phase relationship between said tape frame pulses and said scanner rotation during playback, comprising:
- means for separating a signal envelope of said scan identifier signal from an information signal played back from each said track;
- means for providing a sum of amplitudes of said separated signal envelopes obtained from earliest simultaneously accessed scan identifier signals by a multichannel playback transducer;
- a reference signal generator for applying reference tape frame pulses to said capstan servo; and
- a programmable control means coupled to adjust the phase of said reference tape frame pulses with respect to the phase of rotation of said scanner stepwise by predetermined constant values, thereby stepping said tape relative to said transducer across said helical tracks, to compare each said sum of amplitudes with a subsequently obtained sum, and to store the phase of said tape frame pulses corresponding to the largest sum of amplitudes.

16. A method of acquiring a set of parallel tracks which have been recorded simultaneously on a magnetic recording medium by a rotating multichannel transducer, each track having recorded thereon a predetermined scan identifier signal of a known amplitude and length, said scan identifier signal being recorded simultaneously by said multichannel transducer in a predetermined location along said parallel tracks during a particular scan of the transducer over said medium, scan identifier signals recorded on adjacent sets of parallel tracks being offset in the direction of transducer rotation, comprising the steps of:

reproducing said scan identifier signals and summing amplitudes of scan identifier signals simultaneously accessed by a rotating multichannel transducer during respective scans thereof over said medium;

changing a relative position of said recording medium with respect to said rotating transducer so that said transducer traverses said recorded parallel tracks in a direction substantially normal to a length of said tracks; and detecting a relative medium-to-transducer position in which the largest summed amplitude is obtained during a passage of said transducer over said predetermined location.

17. A method of acquiring a set of parallel helical tracks which have been recorded simultaneously on a magnetic tape by a rotating multichannel transducer, each track having recorded thereon a predetermined scan identifier signal of a known amplitude and length, said scan identifier signal being recorded simultaneoudly by said multichannel transducer in a predetermined location along said helical tracks, scan identifier signals recorded on adjacent sets of helical tracks being offset in the direction of transducer rotation, comprising the steps of:

reproducing a signal recorded on said parallel tracks by a rotating multichannel transducer;

separating said scan identifier signal from an information signal reproduced from each recorded track;

gradually changing a relative position of said magnetic tape with respect to the rotating multichannel transducer during consecutive scans of said transducer over the tape, to obtain a change in said relative position in a direction substantially normal to a length of said tracks;

summing the amplitudes of simultaneously accessed scan identifier signals by said multichannel transducer obtained during a passage of said transducer over said predetermined location; and comparing the summed amplitudes and storing an information related to a relative tape-to-transducer position in which the largest sum of said amplitudes is obtained.

18. The method of claim 17 further comprising the step of adjusting the relative tape-to-transducer position to a position in which the largest sum of said amplitudes is obtained.

19. The method of claim 17 wherein a tape frame signal is recorded synchronously along a longitudinal track of said tape, said signal being phase locked to the rotation of said multichannel transducer during recording, said system further having a capstan servo for maintaining a constant speed of said tape and a predetermined constant phase relationship between said tape frame signal and said scanner rotation during playback, further comprising the steps of:

applying a reference tape frame signal to said capstan servo;

wherein said step of gradually changing said relative position comprises adjusting stepwise the phase of said reference tape frame signal applied to said capstan servo, with respect to the phase of said scanner rotation; and said comparing step comprises storing the phase of said reference tape frame signal corresponding to the largest summed amplitude.

20. The method of claim 19 wherein said adjusting step comprises adjusting the phase of said reference tape frame signal to said stored phase which corresponds to the largest summed amplitude.

21. The method of claim 19 wherein said phase of said reference tape frame signal is adjusted by predetermined constant values.

22. The method of claim 19 wherein said tape has further recorded thereon a control signal along a longitudinal track thereof, synchronously with said tape frame signal, said control signal has a frequency equal to an integer number multiple of the frequency of said tape frame signal and wherein the phase of said reference tape frame signal is adjusted with respect to said scanner rotation by a phase shift equal to an integer number of cycles of said control signal.

23. A method of acquiring a set of parallel tracks recorded simultaneously by a rotary helical scan magnetic tape recording/reproducing device utilizing a multichannel transducer mounted on a rotating scanner, each said helical track having a single frequency periodic scan identifier signal recorded at the beginning thereof, said single frequency periodic signal having a known amplitude and a length smaller than an offset between adjacent sets of helical tracks recorded by said multichannel transducer, said tape having control pulses and tape frame pulses recorded synchronously along longitudinal tracks thereof, which pulses are phase locked to the rotation of said scanner during recording, said control pulses have a frequency equal to an integer number multiple of the frequency of the tape frame pulses, said device having a capstan servo for maintaining a constant speed of said tape and a predetermined constant phase relationship between said tape frame pulses and said scanner rotation during playback, comprising the steps of:

separating a signal envelope of said scan identifier signal from an information signal played back from each said track;

summing amplitudes of said separated signal envelopes obtained from earliest simultaneously accessed scan identifier signals by a multichannel playback transducer;

applying reference tape frame pulses to said capstan servo;

adjusting stepwise the phase of said reference tape frame pulses applied to said capstan servo, with respect to the phase of rotation of said scanner, each step corresponding to a phase shift equal to an integer number of cycles of said control pulses, thereby stepping said tape relative to said transducer across said helical tracks; and comparing the respective sums of amplitudes obtained during respective steps and storing the phase of said reference tape frame pulses corresponding to the largest sum of amplitudes.

* * * * *

UNITED STATES PATENT AND TRADEMARK OFFICE
CERTIFICATE OF CORRECTION

PATENT NO. : 4,760,475
DATED : July 26, 1988
INVENTOR(S) : Jimmy S. Wong, et al

It is certified that error appears in the above-identified patent and that said Letters Patent is hereby corrected as shown below:

Column 7, line 7, "s5=8-/12" should read --s5=8/12--;

Column 7, line 7, "s6323/12" should read --s6=3/12--;

Column 7, line 7, "s7=6-/12" should read --s7=6/12--;

Column 7, line 7, "s8=2/-12" should read --s8=2/12--;

Column 7, line 8, "s9=4/-12" should read --s9=4/12--;

Column 12, line 15, "constructive" should read --consecutive--.

Signed and Sealed this

Seventh Day of August, 1990

Attest:

HARRY F. MANBECK, JR.

*Attesting Officer*     *Commissioner of Patents and Trademarks*